United States Patent [19]

Huebotter et al.

[11] Patent Number: 4,560,533
[45] Date of Patent: Dec. 24, 1985

[54] FAST REACTOR POWER PLANT DESIGN HAVING HEAT PIPE HEAT EXCHANGER

[75] Inventors: Paul R. Huebotter, Western Springs; George A. McLennan, Downers Grove, both of Ill.

[73] Assignee: The United States of America as represented by the United States Department of Energy, Washington, D.C.

[21] Appl. No.: 645,654

[22] Filed: Aug. 30, 1984

[51] Int. Cl.[4] .................................. G21C 15/00
[52] U.S. Cl. ............................. 376/367; 376/405; 165/70
[58] Field of Search ............... 376/171, 174, 179, 287, 376/290, 366, 367, 377, 389, 399, 402, 403, 404, 405, 406; 165/70, 104.14, 104.26

[56] References Cited

U.S. PATENT DOCUMENTS

| | | | |
|---|---|---|---|
| 2,360,094 | 10/1944 | Arvins et al. | 165/70 |
| 3,229,759 | 1/1966 | Grover | 376/367 |
| 3,302,042 | 1/1967 | Grover et al. | 376/367 |
| 3,414,475 | 12/1968 | Fiebelmann | |
| 3,633,665 | 1/1972 | France | 376/367 |
| 3,668,070 | 6/1972 | Fiebelmann et al. | |
| 3,854,524 | 12/1974 | Gregorie et al. | 376/367 |
| 3,866,424 | 2/1975 | Busey | |
| 3,917,509 | 11/1975 | Fisher et al. | |
| 3,924,075 | 12/1975 | Essebaggers | 165/70 |
| 3,967,591 | 7/1976 | Iida | 165/70 |
| 4,072,183 | 2/1978 | Fraas | 165/70 |
| 4,343,763 | 8/1982 | McGuire | 376/367 |
| 4,462,956 | 7/1984 | Boiron et al. | 376/287 |
| 4,478,784 | 10/1984 | Burelbach | 376/367 |

Primary Examiner—Charles T. Jordan
Assistant Examiner—Richard Klein
Attorney, Agent, or Firm—Charles F. Lind; Hugh W. Glenn; Judson R. Hightower

[57] ABSTRACT

The invention relates to a pool-type fission reactor power plant design having a reactor vessel containing a primary coolant (such as liquid sodium), and a steam expansion device powered by a pressurized water/steam coolant system. Heat pipe means are disposed between the primary and water coolants to complete the heat transfer therebetween. The heat pipes are vertically oriented, penetrating the reactor deck and being directly submerged in the primary coolant. A U-tube or line passes through each heat pipe, extended over most of the length of the heat pipe and having its walls spaced from but closely proximate to and generally facing the surrounding walls of the heat pipe. The water/steam coolant loop includes each U-tube and the steam expansion device. A heat transfer medium (such as mercury) fills each of the heat pipes. The thermal energy from the primary coolant is transferred to the water coolant by isothermal evaporation-condensation of the heat transfer medium between the heat pipe and U-tube walls, the heat transfer medium moving within the heat pipe primarily transversely between these walls.

6 Claims, 4 Drawing Figures

FAST REACTOR POWER PLANT DESIGN HAVING HEAT PIPE HEAT EXCHANGER

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

A liquid-metal fast-breeder reactor (LMFBR) uses a large vessel for holding a core within which fission of nuclear materials takes place. A primary coolant, typically molten sodium, is circulated through the core to cool it. An intermediate coolant (generally sodium also) cools the primary coolant by means of a sodium-sodium intermediate heat exchanger (located within the reactor vessel for a pool type system or located outside of the reactor vessel but close by in the same building in a loop type system). A thermodynamic working coolant (water/steam) cools the intermediate coolant by means of a sodium-water heat exchanger (steam generator) located in another building. The steam formed within the steam generator is conveyed via piping to a conventional steam turbine for powering an electric generator.

Thus, the conventional sodium cooled fast reactor power plant requires costly equipment interposed between the reactor core (where nuclear fission takes place), and the steam turbine (which utilizes the thermodynamic heat generated by the nuclear fission). The coolants are maintained separated from one another, other than for thermal heat transfer contacts across the respective heat exchangers, and are circulated by pump means in closed loop coolant systems. The closed loop for the primary coolant of sodium includes the reactor core and the intermediate heat exchanger, with piping and sodium pumps constituting major components. The closed loop for the intermediate coolant of sodium includes the intermediate heat exchanger, the steam generator, piping, pumps, expansion and drain tanks, and purification equipment, and most of these components are located outside of the reactor vessel. The closed loop for the thermodynamic working coolant, or steam system, includes the steam generator, steam turbine, piping, pump, condensors, water purification equipment, and feedwater heaters, and all of these components are located outside of the confinement of the reactor vessel.

The sole purpose of the intermediate coolant loop is to assure that the sodium in the steam generator-steam turbine loop will not be radioactive. For safety reasons, it is considered necessary to separate this water/steam coolant from the radioactive sodium coolant by two barriers, to minimize the possibility of a radioactive fire that could occur otherwise in the event a leak allowed these coolants to contact one another. Conventionally, these two barriers consist of the tube walls in the intermediate heat exchanger and in the steam generator.

One form of heat exchanger is known as a "heat pipe". In the heat pipe, a sealed structure holds a working medium that transfers the heat from a vaporizing section (in heat transfer relationship with a heat source) to a condensing section (in heat transfer relationship with a heat sink). A conventional heat pipe is elongated and the heat source and heat sink are located at opposite ends of the pipe, whereupon the working medium within the pipe evaporates at one end, travels axially along the pipe as a vapor, condenses at the other end, and returns as a liquid on the inner walls of the pipe by gravity or capillary action to the vaporizing end. The heat transfer capacity of such an arrangement is related to the cross sectional area of the heat pipe.

Various proposals have been made to utilize heat pipes as a means for withdrawing heat from the fission reaction and transferring the same to the water/steam coolant system. Heat pipe cooling systems for fission reactors have typically proposed using a separate vessel, apart from the reactor vessel, for holding the heat pipes; but this involves duplicated containment means and appreciably adds to the overall cost. The reason for the need for using a separate containment vessel is in part due to the limited heat transfer capacity per heat pipe, being related to the cross sectional area as noted, where inadequate cooling capacity was provided where the heat pipe cooling systems fitted into the reactor vessel, necessitating therefore a similarly unattractive alternate solution involving increasing the physical size of the reactor vessel to provide the needed space within the reactor for the heat pipes. Also, it is not advisable, for safety reasons, to penetrate the sides of the reactor vessel below the sodium level, which limits alternate design variations of heat pipe cooling systems.

SUMMARY OF THE INVENTION

This invention relates to fission reactors having a reactor core with a primary coolant system thereat and having a steam turbine with a high pressure water coolant system thereat, and utilizes heat pipe heat exchangers located directly between the primary coolant and the steam/water coolant systems for providing the heat transferring function therebetween.

A basic object of this invention is to utilize heat pipes between the primary sodium coolant system and the high pressure water coolant system, thereby eliminating the intermediate coolant loop and its components including the intermediate heat exchanger, piping and pump components.

A related object of this invention is to maintain a two barrier separation between the primary sodium coolant and the high pressure water coolant system by means of separate wall structures for the heat pipe and for the steam/water line.

Another related object of this invention is to use a vaporizable heat transfer medium (typically mercury) which is chemically compatible with both coolants (sodium and water) in a confined heat pipe space between and contacting wall structures otherwise holding these coolants.

Another basic object of this invention is to provide all of the components of the primary coolant system within the reactor vessel containment, and to provide most of the components of the pressurized water coolant system, other than those associated with feedwater treatment and the steam turbine and related piping, within the same reactor vessel.

Another object of this invention is to provide a heat pipe heat exchanger having the evaporator (sodium contacted) wall and condensor (water contacted) wall spaced apart and generally parallel to one another substantially over their entire lengths operable to have the heat transfer medium move predominately in the transverse direction relative to and between the walls and to provide thereby increased heat transfer capacity for the heat pipe.

A detailed object of this invention is to provide horizontal baffles vertically spaced apart along the length of each heat pipe operable to collect the heat transfer medium (mercury) after condensation as a thin liquid layer and return the same to the hot wall. Upstanding perforations in each baffle allow axial vapor flow for equalized distribution throughout the heat pipe, without impeding the ability of the baffle to hold the liquid condensate layer. Soluble wetting agents and corrosion inhibitors might be made as additives to the heat transfer medium (mercury), and a wire mesh or similar wick material can cover the inside surface of the heat pipe so as to promote adequate and uniform wetting.

According to the present invention, during a typical reactor startup period, the heat transfer medium (mercury) within each heat pipe will vaporize to deploy itself along that portion of the pipe length which is submerged in the primary reactor coolant, and thereafter by essentially isothermal evaporation/condensation processes will transfer heat passively between the hot heat pipe wall and the cold internal tube of the steam/water system. At equilibrium, the necessary vapor flow is essentially transversely between the two tube walls.

BRIEF DESCRIPTION OF THE DRAWINGS

The invention will be described in connection with the accompanying drawings in which.

DETAILED DESCRIPTION OF THE PREFERRED EMBODIMENT

Figure 1:
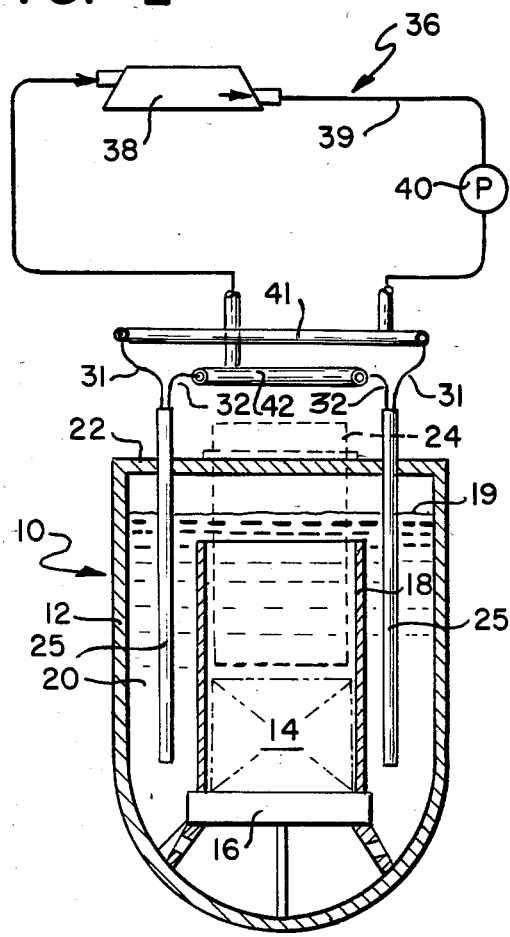
FIG. 1 is a schematic elevational view of a nuclear fission reactor, showing therein the core and primary and high pressure water coolant systems, and the heat pipes disposed therebetween.

A fission reactor 10 is illustrated in the drawings, consisting of a vessel 12 within which a reactor core 14 is housed. The core 14 is mounted on a grid plate assembly 16 for support and distribution of a primary coolant. A cylindrical core barrel 18 defines the outer boundary for coolant flow upwardly from the core. In a pool-type reactor as illustrated, a primary coolant fills the vessel 12 to a level 19 well above the core but just over the top of the core barrel 18. The primary coolant will be heated in the core and discharged from the top thereof and spill over the core barrel 18 to the annular region 20 between the core barrel 18 and the reactor vessel 12. A primary pump (not shown) takes suction from the lower part of this annular region 20 and discharges the coolant to the grid plate assembly 16 to complete the closed flow loop for the primary coolant.

A reactor deck 22 overlies and closes the top of the reactor vessel 12. Upper internal structure, shown herein only schematically as 24, is supported from the vessel deck 22 to allow for reactor control. Flow baffles and radiation barriers, etc. will also be located within and/or surrounding the reactor vessel, but are not shown in the drawing for clarity of the disclosure, as these are not essential to this invention.

A plurality of heat pipe heat exchangers 25 extend downwardly into the annular region 20, supported from the fixed portion of the vessel deck 22. For illustrative purposes, one design of interest has a 4 to 5 meter diameter reactor vessel 12 for a 100 megawatt electric plant, where approximately 500 heat pipes might be used, circumferentially spaced around the annular region 20.

Figure 2:
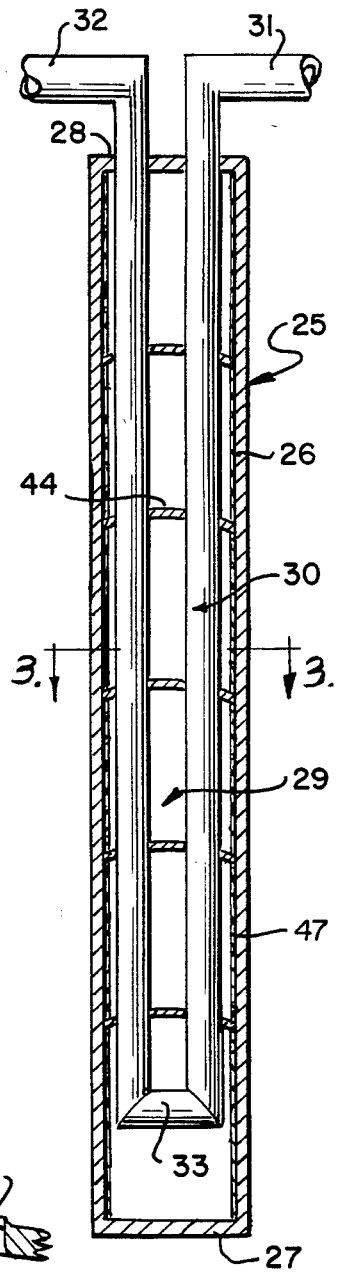
FIG. 2 is an enlarged elevational sectional view of one of the many heat pipes in such a system.
Figure 3:
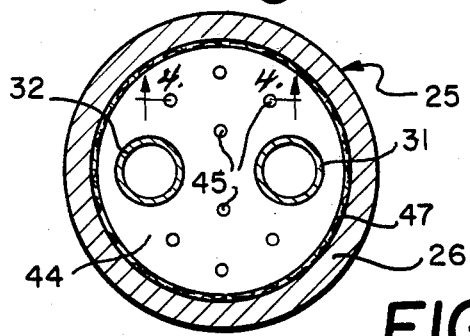
FIGS. 3 and 4 are enlarged sectional views as seen generally from line 3—3 in FIG. 2 and from line 4—4 in FIG. 3, respectively.
Figure 4:

The typical heat pipe 25 includes a cylindrical wall 26 (see FIGS. 2 and 3) and end walls 27 and 28 that define a sealed interior chamber 29. A U-tube 30 having inlet leg 31, outlet leg 32 and crossover leg 33 is extended through the chamber. The U-tube 30 has a substantially regular cross section, typically cylindrical of perhaps 2-5 centimeters/diameter, while the heat pipe tube 26, likewise typically cylindrical, has a diameter of perhaps 7-20 centimeters. Thus, the U-tube is spaced from but quite close to the heat pipe, and the exterior surfaces of the U-tubes are generally facing and parallel to the interior surface of the heat pipe. Moreover the heat pipe might project approximately 5-10 meters beneath the free surface level 19 of the primary coolant. The U-tube 30 extends almost this entire distance opposite the primary coolant, so that the length of the two legs within the heat pipe wall and proximate the primary coolant totals approximately 10-20 meters. This means approximately 200-1000 diameters of length of the U-tube are immediately next to the primary coolant, although separated by the slight clearance within the heat pipe chamber 29 between the wall of the heat pipe and U-tube.

In the embodiment illustrated, the U-tube 30 is connected in the pressurized water coolant system loop 36 including steam power turbine or expansion device 38, piping 39 and feedwater pump 40. The other conventional components including the water purification equipment, and condensors and feedwater heaters are not shown as they form no part of this invention. As illustrated, the inlet leg 31 of one U-tube 30 is connected to a feedwater or inlet plenum 41 and the outlet leg 32 is connected to a steam or outlet plenum 42, to provide for parallel flow between the plenums 41 and 42 through the heat pipes. Variations of this connection are possible, viz., connecting the outlet leg of one U-tube to the inlet leg of another U-tube to form a series connection through certain of the U-tubes.

The heat pipe chamber 29 is filled during manufacture with a specified quantity of boilable heat transfer medium, preferably mercury. Mercury has very good heat transfer coefficients when boiling and condensing on solid surfaces, and is compatible chemically with both water and sodium should its constraining pipes rupture and a leak occur. A 0.5-1.5 liter inventory of mercury might be provided sealed in each heat pipe chamber 29.

Shelves or baffles 44 are deployed along the length of the heat pipe, each traversing the interior cross section of the cylindrical heat pipe wall 26, to effectively segment the boilable liquid inventory. Perforations 45 in the shelf baffles 44 allow limited axial vapor flow across the barrier, such as during startup of the system. These perforations 45 are raised slightly at lip 48 above the main surface of the baffle 44 (such as by punching) so as to allow the baffle to collect the condensate of the heat transfer medium as a thin layer. Preferably, each baffle 44 is slightly domed or pitched to facilitate flow of this condensate layer in the radially outward direction toward the heat pipe wall 26. A wire mesh wick 47 is secured on the inside surface of the heat pipe wall to aid in the uniformity of collection of the heat transfer medium in liquid form at the heat pipe wall.

A preferred design will provide that many sealed heat pipes are submerged in the primary coolant (sodium). The coolant loop 36 for the pressurized water runs through each U-tube in the sealed heat pipe chamber 29 spaced from the walls 26 and 27 thereof. The boilable liquid (mercury) in the sealed heat pipe chamber 29 will provide heat transfer between the sodium and water coolant loops.

Mercury, in the pressure range of 1–10 atmospheres, boils at the operating temperatures of the heated primary coolant (sodium) and condenses at the operating temperatures of the water coolant in the U-tube system. Specifically, the primary coolant of sodium might be 900° F. at the core outlet (in the annular region 20) and 650° F. at the core inlet (at grid 16), and the water coolant line might be pressurized to 1000 psi and be in the liquid phase at 400° F. at the inlet plenum 41 of the heat pipe and in the steam or vapor phase at 100% quality and 545° F. at the outlet plenum 42 of the heat pipe.

The disclosed invention, when used in a fast reactor power station, has several distinct advantages. One major advantage, of course, is the fact that the many components of the intermediate heat transport loop including the intermediate heat exchanger, piping, pumps and even the steam generator can be eliminated. Another major advantage is that the water and sodium coolants are separated from one another by two physical barriers, viz., the heat pipe walls 26, 27, 28 and U-tube walls 31, 32, 33, instead of only one. Moreover, these barrier walls are of easily fabricated simplified design, viz., cylindrical or regular cross sectional tubes, versus the complicated designs of a double walled tube or the like otherwise used in a two fluid heat exchanger. Yet another advantage is that the heat pipes as fabricated and sealed even can be relatively inexpensive, easily transportable, and can be incorporated into the reactor design quite readily.

The heat pipes 25 are confined almost entirely in the reactor vessel 12 and are submerged below the level of the primary coolant therein to be in direct thermal contact with the primary coolant. The heat from the reactor is transferred from the heated heat pipe wall via the evaporation/condensation of the heat transfer medium (mercury) to the U-tube walls for heating the water coolant, and the mass movement and heat transport of this medium within the heat pipe take place transversely to the surfaces of the walls and radially over short distances and not axially over a long distance. This provides for a very effective heat transfer utilization and capacity. Further, the length of the heat pipe can be increased or decreased as needed to increase or decrease almost proportionately the capacity of the cooling system. Of course, using mercury as the heat transfer medium is preferred as it is chemically compatible with both the primary coolant (sodium) of the reactor and the water coolant system of the steam.

The embodiments of this invention in which an exclusive property or privilege is claimed are defined as follows:

1. In a nuclear reactor power plant having a reactor vessel closed by a deck, means for generating fission reaction heat within the vessel, a pool of primary coolant in the vessel for receiving the fission heat, and a pressurized water coolant loop having steam-turbine means located remotely of the reactor vessel, an improved arrangement for transferring heat between the primary and water coolants, comprising a plurality of sealed heat pipe structures depending from the deck and submerged within the primary coolant to be exteriorly heated thereby, each of said heat pipe structures having a heat pipe wall which contacts said primary coolant and defines an interior chamber inside each of said heat pipe structures, a coolant line extending within each heat pipe structure but spaced therefrom, means for connecting said coolant line in the pressurized water coolant loop, a vaporizable heat transfer medium sealed within the interior chambers, said heat transfer medium being capable of being vaporized by absorbing heat from said heat pipe walls, said heat transfer medium also being capable of being condensed by transferring heat to said coolant lines, a plurality of baffles located in the heat pipe structures and dividing each interior chamber up along the length of the coolant line, each of said baffles being generally horizontally disposed to collect condensed heat transfer medium thereon as a layer of condensate, and the baffles being pitched to direct the liquid layer flow toward the heat pipe wall, at least one perforation formed in each said baffle for allowing the migration of the heat transfer medium in vapor form transversely of said baffles, and an upturned edge on said perforations, said upturned edge forming a lip to contain the layer of condensated liquid on said baffles, whereby the heat transfer medium is flowable generally in directions transverse to said structure and wall for effectively transferring heat from the primary coolant to the water coolant via changes of phase by vaporizing off of the heat pipe structure and condensing onto the water coolant line, the pitch in said baffles increasing the transfer of heat by causing condensed heat transfer medium to flow more quickly to the heat pipe structure.

2. A nuclear reactor heat transfer arrangement according to claim 1, wherein the coolant line includes an inlet leg, an outlet leg, and a crossover leg connecting them together.

3. A nuclear reactor heat transfer arrangement according to claim 2, wherein the coolant line extends in each heat pipe structure approximately 200–1000 of its diameters in length.

4. A nuclear reactor heat transfer arrangement according to claim 1, wherein the heat pipe is of the order of 7–20 centimeters in cross dimension and the coolant line is of the order of 2–5 centimeters in cross dimension.

5. A nuclear reactor heat transfer arrangement according to claim 3, wherein the heat pipe is of the order of 7–20 centimeters in cross dimension and the coolant line is of the order of 2–5 centimeters in cross dimension.

6. A nuclear reactor heat transfer arrangement according to claim 5, further including the order of 500 separate heat pipe structures disposed in the reactor vessel.

* * * * *